US009721373B2

(12) United States Patent
Marsella

(10) Patent No.: US 9,721,373 B2
(45) Date of Patent: Aug. 1, 2017

(54) GENERATING INSTRUCTIONS FOR NONVERBAL MOVEMENTS OF A VIRTUAL CHARACTER

(71) Applicant: Stacy Marsella, Playa del Rey, CA (US)

(72) Inventor: Stacy Marsella, Playa del Rey, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 164 days.

(21) Appl. No.: 14/209,473

(22) Filed: Mar. 13, 2014

(65) Prior Publication Data
US 2014/0267313 A1 Sep. 18, 2014

Related U.S. Application Data

(60) Provisional application No. 61/783,398, filed on Mar. 14, 2013.

(51) Int. Cl.
 *G06T 13/00* (2011.01)
 *G06T 13/40* (2011.01)
 *G06T 13/20* (2011.01)

(52) U.S. Cl.
 CPC .............. *G06T 13/40* (2013.01); *G06T 13/00* (2013.01); *G06T 13/205* (2013.01)

(58) Field of Classification Search
 CPC G06T 13/00; G06T 13/40; G06T 3/00; G06T 13/205
 See application file for complete search history.

(56) References Cited

PUBLICATIONS

Audhkhasi, K. et al. 2009. Formant-based technique for automatic filled-pause detection in spontaneous spoken english. In Proceedings of the 2009 IEEE International Conference on Acoustics, Speech and Signal Processing (ICASSP '09). IEEE Computer Society, Washington, DC, USA, p. 4857-4860.
Calbris, G. 2011. Elements of Meaning in Gesture. John Benjamins Publishing, Amsterdam. Chapter 8, pp. 197-242.
Cassell, J. et al. 2001. BEAT: the Behavior Expression Animation Toolkit, Proceedings of ACM SIGGRAPH 2001, Los Angeles, Aug. 12-17, 2001, pp. 477-486.

(Continued)

*Primary Examiner* — Robert Craddock
(74) *Attorney, Agent, or Firm* — McDermott Will & Emery LLP

(57) ABSTRACT

Programs for creating a set of behaviors for lip sync movements and nonverbal communication may include analyzing a character's speaking behavior through the use of acoustic, syntactic, semantic, pragmatic, and rhetorical analyses of the utterance. For example, a non-transitory, tangible, computer-readable storage medium may contain a program of instructions that cause a computer system running the program of instructions to: receive a text specifying words to be spoken by a virtual character; extract metaphoric elements, discourse elements, or both from the text; generate one or more mental state indicators based on the metaphoric elements, the discourse elements, or both; map each of the one or more mental state indicators to a behavior that the virtual character should display with nonverbal movements that convey the mental state indicators; and generate a set of instructions for the nonverbal movements based on the behaviors.

20 Claims, 4 Drawing Sheets

(56) References Cited

PUBLICATIONS

Ekman, P. et al. 1997. What the face reveals: Basic and Applied studies of spontaneous expression using the facial action coding system (FACS), Oxford University press, 1997, Chapter 12, p. 271-288.
Kendon, A. 2002. Some uses of the head shake. Gesture 2, 2, p. 147-183.
Lakoff, G. et al. 1980. Metaphors We Live by, University of Chicago Press, 1980, pp. 7-40; 46-51; 56-68; p. 126-138.
Lee, J. et al. 2006. Nonverbal Behavior Generator for Embodied Conversational Agents, in 6th International Conference on Intelligent Virtual Agents, 2006, pp. 243-255.
Mann, W.C. et al. 1988. Rhetorical Structure Theory: Toward a functional theory of text organization. Text 8(3). pp. 243-281.
Marsella, S. et al. 2013. Virtual Character Performance From Speech. In Proceedings of the Symposium on Computer Animation, Jul. 2013, pp. 25-35.
McClave, E. Z. 2000. Linguistic functions of head movements in the context of speech. Journal of Pragmatics 32, 7 (June), p. 855-878.

" I guess not, I think I must've misread all of those signals."

0.38  0.03          0.04  0.09  0.31 agitation probability (0, 0.45, 0.55)

" I guess not, I think I must've misread all of those signals."

0.38  0.03          0.04  0.09  0.31 emphasis

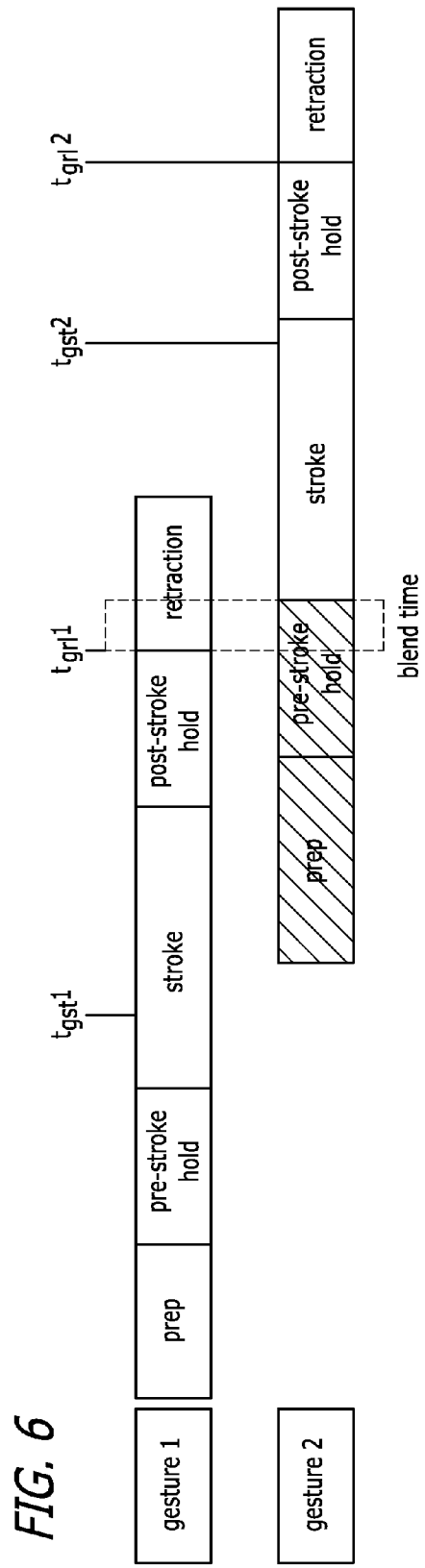

GENERATING INSTRUCTIONS FOR NONVERBAL MOVEMENTS OF A VIRTUAL CHARACTER

CROSS-REFERENCE TO RELATED APPLICATION

This application is based upon and claims priority to U.S. provisional patent application 60/783,398, entitled "CEREBELLA: VIRTUAL CHARACTER PERFORMANCE FROM AUDIO," filed Mar. 14, 2013. The entire content of each of this application is incorporated herein by reference.

STATEMENT REGARDING FEDERALLY SPONSORED RESEARCH

This invention was made with government support under Grant No. W911NF-04-D-0005, awarded by the Army Research Office. The government has certain rights in the invention.

BACKGROUND

Technical Field

This disclosure relates to animating a virtual character.

Description of Related Art

Animating the communications of a virtual character may integrate lip sync movements and nonverbal movements (e.g., facial expressions and head movement). Several approaches extrapolate such movements by spotting specific words, so called keywords, in the text that a character will speak and use a database of keyword-to-behavior rules to select the virtual character's nonverbal movements. For example, a Behavior Expression Animation Toolkit (BEAT) analyzes the text that the virtual character is to speak with user provided rules to detect keywords and phrases. Then, the program automatically generates the speech part of a virtual character, and the associated nonverbal behavior and facial expression given raw text utterances. In another example, an Articulated Communicator Engine (ACE) focuses on generating specific kinds of hand gestures (e.g., deictic and iconic gestures) during speech. The system scans the text that the virtual character is to speak and looks for specific key words in order to display gestures that the designer of the system has associated with those keywords. In yet another example, a Nonverbal Behavior Generator (NVBG) (similarly detects key words in the text to generate gestures, head movements and facial expressions. Keyword approaches, like those in the foregoing examples, may be limited to detecting specific words.

Another approach to animating a virtual character with lip sync movements and nonverbal movements is to analyze the audio signal of the utterance to determine rhythmic features in the audio and then map those rhythmic features to nonverbal movements. For example, detection of prosodic features of the dialog (e.g., loudness) has been used to generate head movement. In another example, audio features have been used to drive gesturing for a subclass of gestures that are rhythmic in nature, so called beat gestures. These approaches to integrate nonverbal movements based on rhythmic features, along with the keyword approaches above, may be limited in that they generally generate facial expressions and head movements without significant value placed on nonverbal communication with the rest of the body (e.g., hand movements and upper body leaning).

SUMMARY

The present disclosure relates to a creating a set of behaviors for lip sync movements and nonverbal communication by analyzing a character's speaking behavior through the use of acoustic, syntactic, semantic, pragmatic, and rhetorical analyses of the utterance.

Some embodiments may include a non-transitory, tangible, computer-readable storage medium containing a program of instructions that cause a computer system running the program of instructions to: receive a text specifying words to be spoken by a virtual character; extract metaphoric elements, discourse elements, or both from the text; generate one or more mental state indicators based on the metaphoric elements, the discourse elements, or both; map each of the one or more mental state indicators to a behavior that the virtual character should display with nonverbal movements that convey the mental state indicators; and generate a set of instructions for the nonverbal movements based on the behaviors.

Some embodiments may include a non-transitory, tangible, computer-readable storage medium containing a program of instructions that cause a computer system running the program of instructions to: receive a text specifying words to be spoken by a virtual character; receive an audio file corresponding to the text; extract metaphoric elements, discourse elements, reference elements, valence elements, or a combination thereof from the text; extract agitation moments, speech disfluency, or both from the audio file; generate one or more mental state indicators based on the metaphoric elements, the discourse elements, the reference elements, the valence elements, or the combination thereof and the agitation moments, the speech disfluency, or both; map each of the one or more mental state indicators to a behavior that the virtual character should display with nonverbal movements that convey the mental state indicators; and generate a set of instructions for the nonverbal movements based on the behaviors.

Some embodiments may include a non-transitory, tangible, computer-readable storage medium containing a program of instructions that cause a computer system running the program of instructions to: receive a text specifying words to be spoken by a virtual character; extract metaphoric elements, discourse elements, or both from the text; generate one or more mental state indicators that the virtual character should display with nonverbal movements based on the metaphoric elements, the discourse elements, or both; map each of the one or more mental state indicators to a set of possible behaviors that the virtual character should display with nonverbal movements that convey the mental state indicators; and generate a set of instructions for the nonverbal movements based on the behaviors.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 6 illustrates an exemplary scheduling blending transition to solve a conflict between two gesture animations.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

The present disclosure relates to a creating a set of behaviors for lip sync movements and nonverbal communication by analyzing a character's speaking behavior through the use of acoustic, syntactic, semantic, pragmatic, and rhetorical analyses of the utterance.

In some embodiments, the analysis may infer the mental state of the speaker. As used herein, the mental state of the speaker includes both the communicative intent (i.e., what the speaker explicitly intends to communicate, e.g., quantification, comparison, affirmation, intensification, or negation) as well as the underlying emotional and cognitive states of the speaker (e.g., stress, cognitive load, confusion, or joy). The result of these analyses may then mapped to a set of instructions for nonverbal movements (e.g., head movements, facial expressions, gaze, and gestures) that a virtual character should exhibit while speaking the utterance or a listener would exhibit while listening to the utterance. By composing an integrated performance for the utterance, a wide range of unique, expressive performances, attuned to each utterance may be produced.

Figure 1:
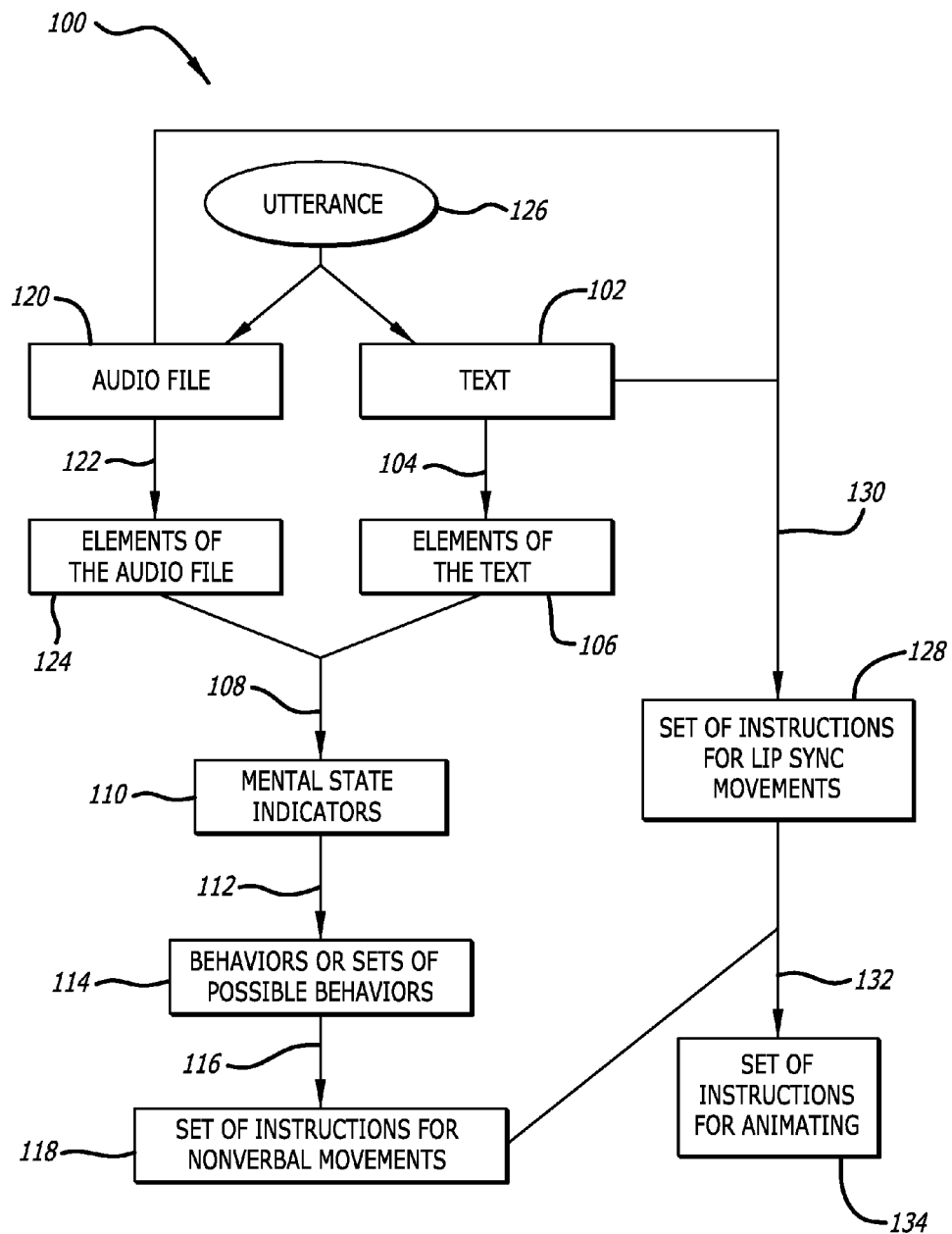
FIG. 1 illustrates a flow diagram of a program of instructions according to at least some embodiments described herein.

FIG. 1 illustrates a flow diagram of a program of instructions 100 according to at least some embodiments described herein. In some embodiments, a program of instructions 100 for converting text 102 into a set of instructions for nonverbal movements 118 of a virtual character may involve text analyses (or subprograms) 104 for extracting elements of the text 106 (e.g., words and phrases). Exemplary elements of the text 106 may be include metaphoric elements (e.g., metaphors, allegories, hyperboles, and similes), discourse structure elements (e.g., enumerations, comparisons, and contrasts that indicate deictic (pointing) movements), reference elements (e.g., self-reference and reference to objects in the local environment), and valence elements (e.g., text elements that indicated affirmation or negation).

In some embodiments, after extracting the various elements of the text 106, a subprogram 108 may generate one or more mental state indicators 110 (e.g., quantification, comparison, affirmation, intensification, or negation) corresponding to the elements of the text 106. Each of the mental state indicators 110 may then be mapped to a behavior or set of possible behaviors 114 for the virtual character to display using a mapping subprogram 112. Then, a set of instructions for the nonverbal movements 118 may be generated based on the behaviors or sets of possible behaviors 114 with an animation subprogram 116. In some instances, for fluid movement of the virtual character, generation of the set of instructions for the nonverbal movements 118 may exclude some of the behaviors or sets of possible behaviors 114 when time does not permit for abutting behaviors to be performed fluidly.

In some embodiments, the program of instructions 100 may also be configured to receive annotations (not shown) similar to the mental state indicators 110 corresponding to portions of the text 102 that may be used in the program of instructions 100 in a similar fashion as the mental state indicators 110.

In some instances, the program of instructions 100 may also be configured to receive an audio file 120 corresponding to the text 102 and analyze the audio file 120 with audio analyses 122 (subprograms). Analysis of the audio file 120 may include extracting elements of the audio file 124 (e.g., agitation moments, speech disfluency moments, or a combination thereof). These elements of the audio file 124 may, in some embodiments, be used in conjunction with the elements of the text 106 for generating the mental state indicators 110, which may be further be treated as discussed above.

In some embodiments, the program of instructions 100 may also be configured to receive an utterance 126, which may be converted into the audio file 120 and the text 102 (e.g., a text transcription). In some embodiments, this conversion may be performed separately, and the audio file 120 and the text 102 be received separately. In some embodiments, the utterance 126 may be a recorded utterance. In some embodiments, the utterance 126 may be a real-time utterance.

In some embodiments, the program of instructions 100 may be configured for producing a set of instructions for lip sync movements 128 of the virtual character based on the text 102 and the audio file 120 using a lip sync subprogram 130.

In some embodiments, the program of instructions 100 may be configured for producing a set of instructions for animation of the virtual character 134 with an animation subprogram 132 based on the set of instructions for nonverbal movements 118 of the virtual character and the set of instructions for lip sync movements 128 of the virtual character.

In some embodiments, the program of instructions 100 may also be configured for producing and storing the set of instructions for the nonverbal movements 118, the set of instructions for lip sync movements 128, the set of instructions for animation of the virtual character 134, or a combination thereof for later use in animating the virtual character (e.g., in a game or in a video).

In some embodiments, the program of instructions 100 may also be configured for real-time production of the set of instructions for the nonverbal movements 118, the set of instructions for lip sync movements 128, the set of instructions for animation of the virtual character 134, or a combination thereof in conjunction with real-time animation (e.g., in a game, in a video or film, in a training simulation, or in virtual face-to-face interactions).

Text Analysis—Metaphoric Elements

In speech, metaphors are often accompanied with gestures (nonverbal movements). For example, time may be gestured as a moving object (e.g., keywords like before, then, after, first, second, third, and the like may correspond to an arm movement across the body indicating corresponding points on a timeline). In another example, abstract ideas may be allowed to have physical properties that would provide for corresponding gestures (e.g., "a big idea" may correspond to a gesture that indicates the idea occupies a set region in space).

Metaphoric elements may, in some embodiments, be identified through keyword analysis.

Text Analysis—Discourse Structure Elements

Discourse structure elements may include rhetorical structures including enumerations, comparisons, and contrasts that drive pointing or counting gestures. For example, a phrase like "this idea as oppose to that idea" may correspond to gesturing left then right.

Discourse structure elements may, in some embodiments, be identified through keyword analysis. In some embodiments, discourse structure elements may be identified through rhetorical parsing. In some instances, rhetorical parsing may involve annotating the text with the syntactic structure (e.g., nouns, verbs, and other parts of speech) and identifying patterns that indicate discourse structure elements. Such identification may utilize manually written identification techniques, machine learning techniques, or a combination thereof.

Text Analysis—Reference Elements

Reference elements in the text may include references to objects in the environment (e.g., the listener, or inanimate objects in the environment like a table or the sky), self-references, and the like. Reference elements may, in some embodiments, be identified through keyword analysis.

Text Analysis—Valence Element

A valence elements may include words and phrases that indicate affirmation or negation. For example, valence elements may be as simple as "yes" and "no" or more complex like "we can do that" or "we'd rather do something else." Valence elements may, in some embodiments, be identified through keyword analysis.

Audio Analysis—Agitation

In one example, extracting agitation moments from an audio file may be achieved by using acoustic-based hidden Markov (HMM) models to detect emotions in the audio such as urgency, valence (happy vs. sad), and arousal (calm vs. excited). In some instances, such HMM models may be learned (e.g., by supervised machine learning) from audio files annotated with emotion information.

In yet another example, extracting agitation moments from an audio file may be achieved by detecting and assessing the overall agitation level (low/middle/high) or tenseness of a speaker for a given utterance. To do so, the voice quality (e.g., the coloring or timbre of the voice) may be analyzed on a tense to lax dimension. Generally, tense speech may be associated with high agitation, modal speech with mid-level agitation, and lax speech with low agitation. Recognition of the voice quality may utilize fuzzy-input fuzzy-output support vector machines (F²SVM) and standard Mel frequency cepstral coefficients (mfcc).

mfcc may be perceptually inspired features capturing the overall spectral and phonetic information of the speech signal in a compact manner. For example, twelve coefficients may be extracted from the speech signal using Hanning windowed 32 ms frames with a 10 ms shift. The energy of each speech frame may be calculated on 32 ms windows with a shift of 10 ms. This speech window w(t) is filtered with a hamming window and the energy (Formula I) can be calculated and converted to the dB-scale (Formula II).

$$e(t) = \Sigma_{i=1}^{|w(t)|} w_i(t)^2 \qquad \text{Formula I}$$

$$e_{dB}(t) = 10 * \log_{10}(e(t)) \qquad \text{Formula II}$$

In some instances, methods based on residual harmonics may be used for tracking the fundamental frequencies ($f_0$). The residual signal r(t) may then be calculated from the speech signal s(t) for each frame using inverse filtering. This process may advantageously remove strong influences of noise and vocal tract resonances. For each r(t) the amplitude spectrum E(f) may then be computed, showing peaks for the harmonics of $f_0$, the fundamental frequency. Then, the summation of residual harmonics (SRH) may be computed by Formula III.

$$SRH(f) = E(f) + \sum_{k=2}^{N_{harm}} \left[ E(k*f) - E\left(\left(k - \frac{1}{2}\right)*f\right) \right] \qquad \text{Formula III}$$

for $f \in [f_{0,min}, f_{0,max}]$ with $f_{0,min} = 20$ and $f_{0,max} = 500$

The frequency f for which SRH(f) is maximal is considered the fundamental frequency of this frame. By using a simple threshold, the unvoiced frames may be discarded.

Agitation level detection may utilize F²SVM. The F²SVM may be capable of receiving soft labelled data and producing soft outputs with predicted memberships $m_i$ assigned over multiple classes for each presented sample. The F²SVM may be trained using speech corpuses. In order to detect the agitation level, the median mfcc value for an unseen utterance and choose an agitation probability (i.e., low/medium/high) with maximal membership value assigned $\text{argmax}_i(m_i)$ by the trained F²SVM as the observed agitation level.

In some embodiments, the level and occurrence of agitation moments may be used in further processing of the text and audio file.

Figure 2:
FIG. 2 illustrates a portion of the analysis of a phrase using an exemplary analysis for detecting agitation moments.
Figure 2:

FIG. 2 illustrates a portion of the analysis of a phrase using an exemplary analysis for detecting agitation moments. The phrase "I guess not, I think I must've misread all of those signals" is processed. Using the analysis described above may provide for five points (or frames) of the phrase with acoustic level values (or audio signal intensities) of significance. Then, the agitation probability is determined, which, in this instance, was calculated at (0, 0.45, 0.55). Accordingly, the probability for agitation, in this instances, is high.

Audio Analysis—Emphasis

Similar to the agitation moments above, the fundamental frequencies ($f_0$) of the audio may be analyzed to produce acoustic level values, which may be used for identifying emphasis moments. In order to identify the parts of speech that are stressed, thresholds $\theta(f_0)$ and $\theta(e_{dB})$ as the $90^{th}$ percentile of both $f_0$ and the observed signal intensity ($e_{dB}$) for each utterance individually. Each analyzed feature frame larger than one of the thresholds may be considered stressed. Based on the word timings for the analyzed utterances, a stressed ratio $\epsilon[0, 1]$ for each word (i.e., the amount of stressed frames divided by the total length of the word). In some embodiments, the level and occurrence of emphasis moments may be used in further processing of the text and audio file.

Figure 3:
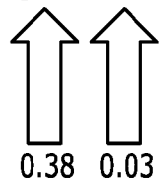
FIG. 3 illustrates a portion of the audio analysis of a phrase using an to identify emphasis moments.
Figure 3:

FIG. 3 illustrates a portion of the audio analysis of a phrase using an to identify emphasis moments. The phrase "I guess not, I think I must've misread all of those signals" is processed. The audio may be analyzed for emphasis moments as describe above to yield five points (or frames) of the phrase with acoustic level values (or audio signal intensities) of significance. Then, the emphasis words are determined, which, in this instance, were above a threshold of 0.3. These emphasis words may then trigger rules for producing a nonverbal movement corresponding to the emphasis.

Audio Analysis—Speech Disfluency

Speech disfluency may be moments of pause or stuttering detected in the audio file and may indicate moments of thought that may be conveyed nonverbally through a gaze or squinting of the eyes.

Mental State Indicators

Mental state indicators may be generated by combining the audio analyses and text analyses in a pattern-matching rule invocation that builds up hierarchical interpretations and outputs communicative indicators that in a behavior mapping model trigger certain behaviors. The goal is not necessarily to derive the overall meaning of the utterance but rather to identify what the speaker intends to communicate, the underlying emotional and mental states of the speaker, the use of discourse connectives, and the use of metaphors, each of which are closely tied to nonverbal behavior. Exemplary mental state indicators may include those listed in Table 1.

TABLE 2

| Mental State Indicator | Description | Examples |
| --- | --- | --- |
| affirmation | agree or accept | okay, yes |
| negation | negate or reject | not, no |
| interrogative | direct or indirect questions | what, where, when |
| contrast | phrase level contrasts | aside from, other than |
| process | process denote and state | stop, continue, done |
| quantification | set cardinality | a lot, none, everything |
| comparison | comparatives and superlatives | better, best |
| spatial relation | actual or metaphor | beyond, farther |
| physical relation | actual or metaphor | longer, larger |
| mental state | cognitive and emotional state | speech disfluency, word search |
| performance factor | cognitive load and processes | uncertainty |
| deixis | abstract or concrete pointing | those people |
| modal | likelihood, ability, permission, obligation | have to, must, should |
| emphasis | rhythmic/prosodic | stressed words and phrases |
| intensifier | adverbs of degree | very, extremely |
| valence | emotion/valence words | awesome, awful |

In some instances, combining the audio analyses and test analyses may produce conflicting mental state indicators. For example, discourse structure element may infer a comparative, and a corresponding emphasis moment may indicate the same phrase should be heavily emphasized. Therefore, in some embodiments as part of generating mental state indicators, each mental state indicator inferred by the audio and text analyses may be assigned with a priority based on the class of the mental state indicator and whether the words it spans are stressed (e.g., as determined by the emphasis analysis above). These priorities may assist in resolving conflicts between overlapping mental state indicators with lower priorities being dropped.

The rules that govern the mental state indicators generations and conflict resolution may be derived from literature, machine learning techniques, or a combination thereof.

Behaviors

The mental state indicators may be mapped to a behavior or a set of possible behaviors. Exemplary behaviors may include, but are not limited to, head movements (e.g., along each X, Y, or Z axes), gazing (e.g., at objects in the virtual scene or angular offsets from them), blinking, saccadic eye movements, hand/arm gesturing (e.g., pointing and waving), body gesturing (e.g., leaning), and facial expressions. Examples of sets of alternative behaviors for various mental state indicators are provided in Table 2. Using a set of possible behaviors may provide for variability in the character's behavior from one utterance to the next.

TABLE 2

| Mental State Indicators | Sets of Possible Behaviors |
| --- | --- |
| affirmation | big nod, tilt left nod, tilt right nod |
| negation | gesture negation, shake, small shake |
| interrogative | gesture question, brow raise |
| contrast | gesture contrast, tilt right, tilt left |
| comparison | gesture comparative, gesture comparative longer, gesture comparative bigger |
| mental state | tilt half nod left, shrug |
| performance | gaze aversion upright, short blink |
| emphasis | gesture point left, gesture point right, gaze left, gaze right |
| intensifier | brow frown, half nod |

Many behaviors may be mapped to the same mental state indicators, the examples provided herein should not be viewed as limiting. In some instances, the mental state indicators may be randomly mapped to behaviors in order to provide variation in the performance. In some instances, heuristics may be implemented in order to prevent inordinate amounts of hand switching while gesturing, or overly repetitive activations.

The rules that govern the behavior mapping and conflict resolution may be derived from literature, machine learning techniques, or a combination thereof.

Instructions for Nonverbal Movements

The behaviors may be used to generate a set of instructions for nonverbal movements for a virtual character. For example, behaviors may be specified with start and end times (e.g., corresponding to when words start or end or when other behaviors start and end). These may be then synthesized into a set of instructions for nonverbal movements of the virtual character.

Effectively synthesizing behaviors that are suitable for specific utterances may by challenging since the motions should synchronize with the dialog while conveying proper meanings based on the context. In some embodiments, naïve playback may be used to develop the set of instructions for nonverbal movements. However, this method may produce poor animation results since there could be conflicts in timings between two consecutive gestures.

As each behavior gets mapped to its corresponding set of instructions, additional conflicts may appear due to timing and implementation. Such conflicts may not visible when the mental state indicators are mapped to behaviors but become clearer when concrete behaviors arc derived from their original abstraction. Exemplary conflicts may include overlapping of behaviors or behaviors that are too close in time for the resulting animation to be realized smoothly. Thus, to reduce conflicts, behaviors with higher priorities may be retained and those with lower priority removed.

In some embodiments, gestures may be derived from motion data that is either hand-constructed by an animator or generated from motion capture. Each separate behavior may correspond to a different gesture, where, in some instances, each agitation state may utilize a different gesture for that behavior. For example, a beat gesture while agitated may be faster and performed with more energy than the same beat gesture in the neutral agitation state.

In some instances, a gesture may be capable of being performed single or double handed, and an agitation may be used in determining which to use. In some instances, a single handed version may be mirrored to generate an equivalent gesture on the other hand.

In some embodiments, the gender of the speaker or the virtual character may considered when determining gestures. For example, male and female characters may have different gesture sets to reflect different styles of movement.

In some embodiments, a personality type or personality trait of the speaker or the virtual character may considered when determining gestures. For example, an introvert personality and an extravert personality may have different gesture sets to reflect different styles of movement.

An exemplary animation subprogram for generating a set of instructions for nonverbal movements from behaviors may utilize Behavior Markup Language (BML) standards. The BML layer may provide an abstraction to the animation system. For example, a behavior may be be specified as follows: "gesture to the left starting at 0.34 and ending at 1.2" or "nod your head slightly starting at 3.4 and ending at 3.8." The animation system must then interpret these high-level instructions to synthesize the final motion.

Figure 4:
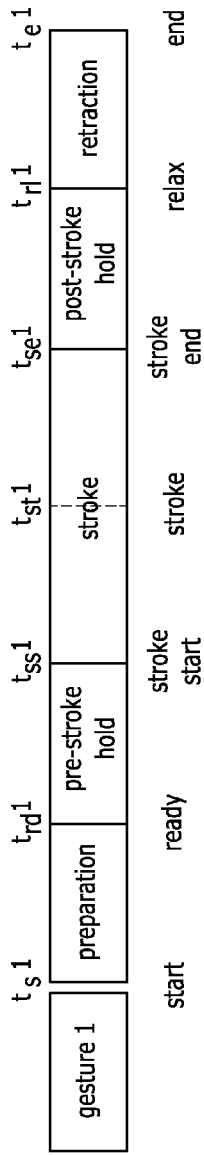
FIG. 4 illustrates an exemplary gesture animation having seven time markers

FIG. 4 illustrates an exemplary gesture animation having seven time markers: start time ($t_s$), ready time ($t_{rd}$), stroke start time ($t_{ss}$), stroke time ($t_{st}$), stroke end time ($t_{se}$), relax time ($t_{rl}$), and end time ($t_e$). These markers construct five phases: (1) preparation, (2) pre-stroke hold, (3) stroke, (4) post-stroke hold, and (5) retraction. In this example, the most meaningful phase of the gesture is the stroke, which is the focus gestures are strung together in this exemplary animation subprogram.

This exemplary animation subprogram may use the following rules, or variations thereof, for producing the set of instructions for nonverbal movements for a virtual character. Each gesture $G_i$, $i=1 \to n$ includes a gesture category $c^i$, timings for desired stroke strike time $t_{gst}^i$ and desired relax time $t_{grl}^i$, and a priority value $pr^i$ that indicates the importance of this gesture. For each $G_i$, a gesture animation $A_i$ is selected from database based on its category $c^i$ (e.g., a database of the set of alternative behaviors described above). The selected animation should fit the constraint $t_{rl}^i - t_{st}^i \leq t_{grl}^i - t_{gst}^i$, which indicates that the sum of the animation's stroke and post stroke duration fits the time duration indicated by the desired stroke and relax times. If no such animation fits the desired timing constraint, the gesture $G_i$ may be discarded. In some instances, the velocity $v_i$ of hand movements for $A_i$ may also be computed and aligned with the desired timing in $G_i$ by offsetting $t_{st}^i$ to $t_{gst}^i$ and also extending the post-stroke gesture hold period by shifting $t_{rl}^i$ to $t_{grl}^i$. This process may be used to layout all gesture animations on the timeline with proper timing.

Figure 5:
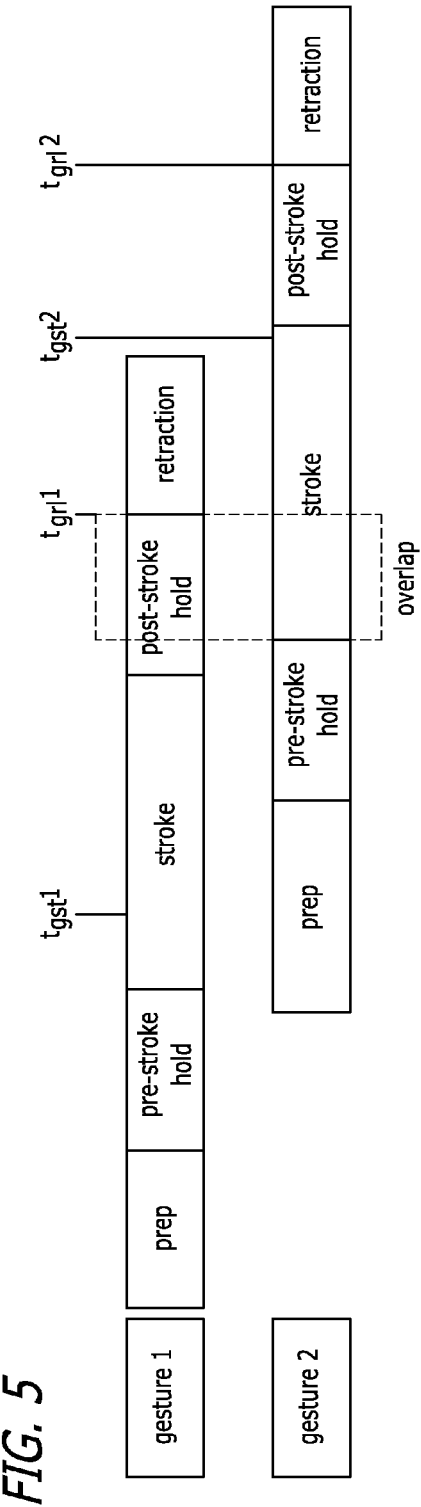
FIG. 5 illustrates an exemplary scheduling conflict between two gesture animations.

This exemplary animation subprogram may use the following rules, or variations thereof, to reconcile conflicts between adjacent gestures. For example, if $t_s^{k+1} < t_e^k$, then $A_k$ will still be in effect when $A_{k+1}$ should start. (Rule 1) If $t_{ss}^{k+1} < t_{grl}^k$, the two gestures could not be concatenated, otherwise the stroke phase of the $A_{k+1}$ has to shrink and lose meaning. FIG. 5 illustrates an exemplary scheduling conflict between two gesture animations. In this instance, the gesture with lower priority between should be removed from the timeline. (Rule 2) If $t_{ss}^{k+1} > t_{grl}^k$, the two gestures may be concatenated together by a blending transition from $t_{grl}^k$ in $A_k$ to $t_{ss}^{k+1}$ in $A_{k+1}$ and remove the portion of $t < t_{ss}^{k+1}$ in $A_{k+1}$ from the timeline. As such, $A_{k+1}$ would start directly from the stroke start point, instead of the idle pose. FIG. 6 illustrates an exemplary scheduling blending transition to solve a conflict between two gesture animations. (Rule 3) The transition velocity $v_{k \to k+1}$ may be computed using the time interval $t_{ss}^{k+1} - t_{grl}^k$ and the distance between hand positions in $t_{grl}^k$ and $t_{ss}^{k+1}$. If $v^{k \to k+1} - v^{k+1} > v^{th}$, where $v^{th}$ is the gesture blend speed threshold, then there is not enough time to blend from $A_k$ to $A_{k+1}$ without incurring an obvious velocity change. This may impact the animation quality when concatenate two gestures together. Accordingly, one of the following may be executed (1) replace $A_{k+1}$ with a new animation $A'_{k+1}$ in category $c^{k+1}$ that fits the velocity constraint or (2) remove the gesture with lower priority from the timeline. (Rule 4) If $v_{k \to k+1} < v^{k+1}$, then reduce $v_{k \to k+1}$ to avoid velocity discontinuity artifacts. This may be achieved by postponing $t_{grl}^k$ to $t_{grl}^{k*} = t_{grl}^k$ so that $v_{k \to k+1} = v^{k+1}$ with the new time interval $t_{ss}^{k+1} - t_{grl}^k - t_h$. This rule may yield more gesture holding to match the velocity $v_{k \to k+1}$ to the velocity $v^{k+1}$ of next gesture. In some instances, a Perlin noise may be used in conjunction with this rule to mitigate a "freezing" effect during a gesture hold.

Generally, this exemplary animation subprogram does not to timewarp speed up or slow down) the gestures for the purpose of coarticulation. However, in some embodiments, timewarping may be utilized in this or other similar animation subprogram.

Lip Syncing

Lip syncing may be achieved with any suitable lip syncing subprogram for converting an audio file and a text into a set of instructions for lip sync movements for the virtual character. While a plurality of lip syncing subprograms may be available to perform such a task, an exemplary lip syncing subprogram may use a diphone-based approach where the audio signal is aligned to the words in an utterance by a commercial tool that generates phonemes and aligns them according to the speech signal. In some instances, a lip syncing subprogram may also use the emphasis moments described herein to drive an open-mouth shape in order to simulate the wider opening of the mouth while speaking more loudly.

Instructions for Animation

Animation of the virtual character may be achieved with any suitable subprogram for synchronizing the set of instructions for nonverbal movements of the virtual character and the set of instructions for lip syncing into a set of instructions for animation of the virtual character.

An exemplary subprogram may handle behavior requests through separate control over various joints in the character's skeletal hierarchy. The subprogram may use a control hierarchy which progresses from gross movements that involve the entire body, to smaller movements that only override a small number of joints, such as the eye joints. In the following order, this exemplary subprogram may evaluate the underlying idle pose, then gestures, then gazing, then head movements, then facial expressions, then eye and eyelid motion. In some instances, requests to perform gazing, gestures, or eye movements may override motion generated from the lip sync subprogram, while head movements may be added to, rather than replacing, the previously synthesized motion.

This exemplary subprogram may, in some embodiments, use a mix of procedurally-based and data based components. For example, the head controller drives several head and neck joints according to a phase-shifted sine wave over a period of 1 second. For example, the BML specification for head movements may include nods (movements along the x-axis), shakes (movements along they-axis), and tosses (movements along the z-axis). Despite the simplicity of the such a controller, there may be a great variation of head movement capability based on the BML specification. For example, head movements can be smaller (e.g., lower the magnitude of the sine wave), longer (e.g., extend the duration of the sine wave), or combined together to form complex head movements involving several degrees of freedom.

Listener Feedback

Optionally, an aspect of listener feedback may be included in the embodiments described herein. Listener feedback may be generic movements in response to the speaker's nonverbal behaviors (including prosody) and the listener's unfolding interpretation of, and reaction to, the speaker's utterance. For example, a listening character may perform backchannelling in response to pauses in the speech, as well as mirroring of head movement behaviors.

In some instances, the program of instructions, analyses, and subprograms discussed herein may be useful for creating the behavior of characters capable of face-to-face spoken dialog interaction with people, for implementing inside a previsualization tool for film and television, for animating non-player characters (NPCs) in video games, for animating an avatar for interactive applications, and for creating a web persona.

Unless otherwise indicated, the program of instructions, analyses, and subprograms that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system for the program of instructions, analyses, and subprograms may be a desktop computer or a portable computer, such as a laptop computer, a notebook computer, a tablet computer, a PDA, a smartphone, or part of a larger system, such a vehicle, appliance, and/or telephone system.

A single computer system may be shared by the program of instructions, analyses, and subprograms.

Each computer system for the program of instructions, analyses, and subprograms may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or nonvolatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A non-transitory, tangible, computer-readable storage medium containing a program of instructions that cause a computer system running the program of instructions to:
   receive a text specifying words to be spoken by a virtual character;
   extract metaphoric elements, discourse elements, or both from the text;
   generate one or more mental state indicators based on the metaphoric elements, the discourse elements, or both;
   map each of the one or more mental state indicators to a behavior that the virtual character should display with nonverbal movements that convey the mental state indicators; and
   generate a set of instructions for the nonverbal movements based on the behaviors,
   wherein the program of instructions also causes the computer system running the program of instructions to do one of a, b, or c:
   a. extract reference elements, valence elements, or both from the text; and wherein generate the one or more mental state indicators is further based on the reference elements, valence elements, or both,
   b. receive an audio file corresponding to the text; extract emphasis moments, agitation moments, speech disfluency, or a combination thereof from the audio file; and generate the one or more mental state indicators further based on the emphasis moments, the agitation moments, the speech disfluency, or the combination thereof, or
   c. generate a set of instructions for a listener's nonverbal movements in response to the set of instructions for nonverbal movements of the virtual character.

2. The medium of claim 1, wherein the program of instructions causes the computer system running the program of instructions to do the subpart labeled a.

3. The medium of claim 1, wherein the program of instructions causes the computer system running the program of instructions to do the subpart labeled b.

4. The medium of claim 1, wherein generate the set of instructions for the nonverbal movements involves elimination of some of the behaviors.

5. The medium of claim 1, wherein the program of instructions also cause the computer system running the program of instructions to: convert an utterance into the text and the audio file.

6. The medium of claim 5, wherein the utterance is a real-time input.

7. The medium of claim 1, wherein the set of instructions for nonverbal movements of the virtual character based on a gender or a personality of the virtual character.

8. The medium of claim 1, wherein the program of instructions that also cause the computer system running the program of instructions to: produce a set of instructions for lip sync movements of the virtual character based on the text and the audio file.

9. The medium of claim 8, wherein the program of instructions that also cause the computer system running the program of instructions to: produce a set of instructions for animation of the virtual character based on the set of instructions for nonverbal movements of the virtual character and the set of instructions for lip sync movements of the virtual character.

10. The medium of claim 1, wherein the program of instructions also cause the computer system running the program of instructions to: generate a set of instructions for a listener's nonverbal movements in response to the set of instructions for nonverbal movements of the virtual character.

11. The medium of claim 1, wherein the behaviors include at least one of: head movements, gazing, blinking, saccadic eye movements, hand gesturing, body gesturing, or facial expressions.

12. A non-transitory, tangible, computer-readable storage medium containing a program of instructions that cause a computer system running the program of instructions to:
   receive a text specifying words to be spoken by a virtual character;
   receive an audio file corresponding to the text;
   extract metaphoric elements, discourse elements, reference elements, valence elements, or a combination thereof from the text;
   extract agitation moments, speech disfluency, or both from the audio file;
   generate one or more mental state indicators based on the metaphoric elements, the discourse elements, the reference elements, the valence elements, or the combination thereof and the agitation moments, the speech disfluency, or both;
   map each of the one or more mental state indicators to a behavior that the virtual character should display with nonverbal movements that convey the mental state indicators; and
   generate a set of instructions for the nonverbal movements based on the behaviors.

13. The medium of claim 12, wherein the program of instructions also cause the computer system running the program of instructions to: extract emphasis moments, or both from the audio file; and generate the one or more mental state indicators further based on the emphasis moments, or both.

14. The medium of claim 12, wherein the program of instructions also cause the computer system running the program of instructions to: convert an utterance into the text and the audio file.

15. The medium of claim 12, wherein the program of instructions that also cause the computer system running the program of instructions to: produce a set of instructions for lip sync movements of the virtual character based on the text and the audio file.

16. A non-transitory, tangible, computer-readable storage medium containing a program of instructions that cause a computer system running the program of instructions to:

receive a text specifying words to be spoken by a virtual character;
extract metaphoric elements, discourse elements, or both from the text;
generate one or more mental state indicators that the virtual character should display with nonverbal movements based on the metaphoric elements, the discourse elements, or both;
map each of the one or more mental state indicators to a set of possible behaviors that the virtual character should display with nonverbal movements that convey the mental state indicators; and
generate a set of instructions for the nonverbal movements based on the behaviors,
wherein the program of instructions also causes the computer system running the program of instructions to do one of a or b:
  a. extract reference elements, valence elements, or both from the text; and generate the one or more mental state indicators further based on the reference elements, valence elements, or both, or
  b. receive an audio file corresponding to the text; extract emphasis moments, agitation moments, speech disfluency, or a combination thereof from the audio file; and generate the one or more mental state indicators further based on the emphasis moments, the agitation moments, the speech disfluency, or the combination thereof.

17. The medium of claim 16, wherein the program of instructions cause the computer system running the program of instructions to do the subpart labeled a.

18. The medium of claim 16, wherein the program of instructions causes the computer system running the program of instructions to do the subpart labeled b.

19. The medium of claim 16, wherein the program of instructions also cause the computer system running the program of instructions to: convert an utterance into the text and the audio file.

20. The medium of claim 16, wherein the program of instructions that also cause the computer system running the program of instructions to: produce a set of instructions for lip sync movements of the virtual character based on the text and the audio file.

* * * * *